United States Patent Office 2,901,808
Patented Sept. 1, 1959

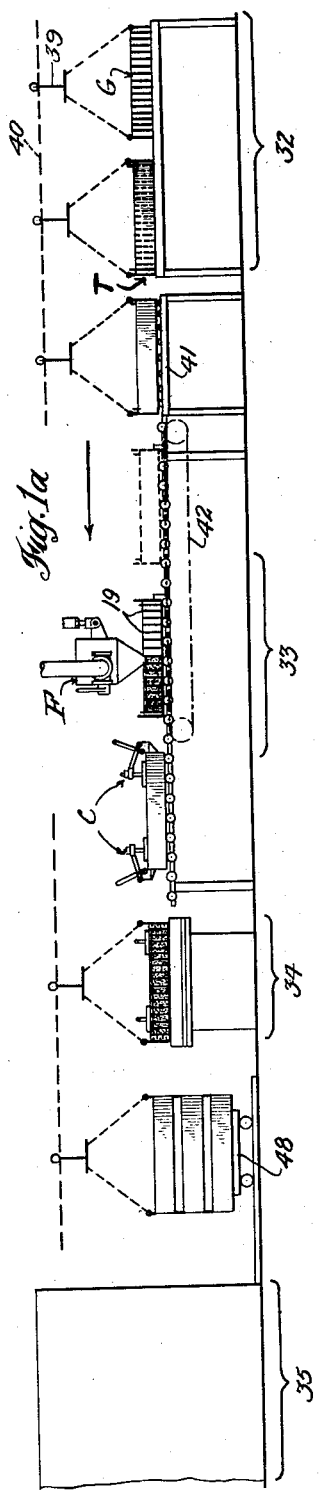
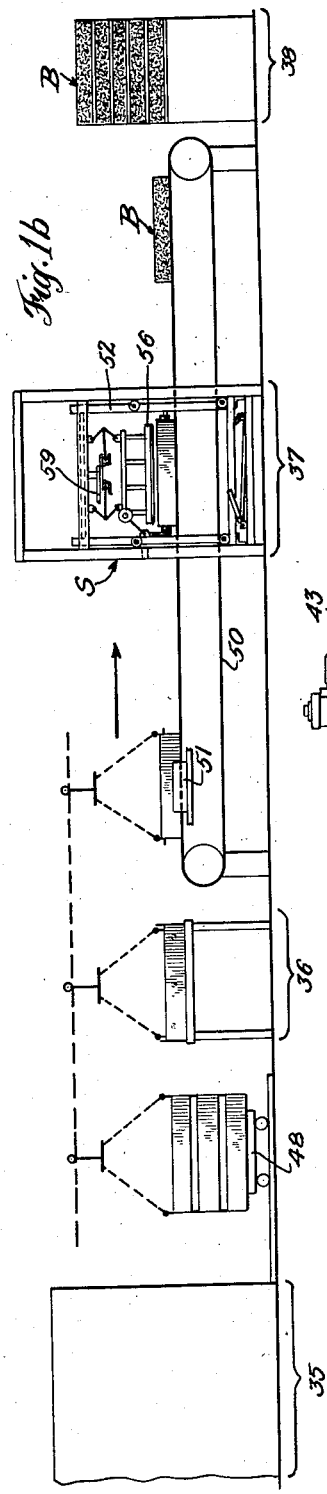
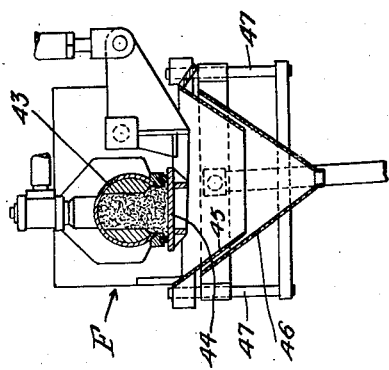

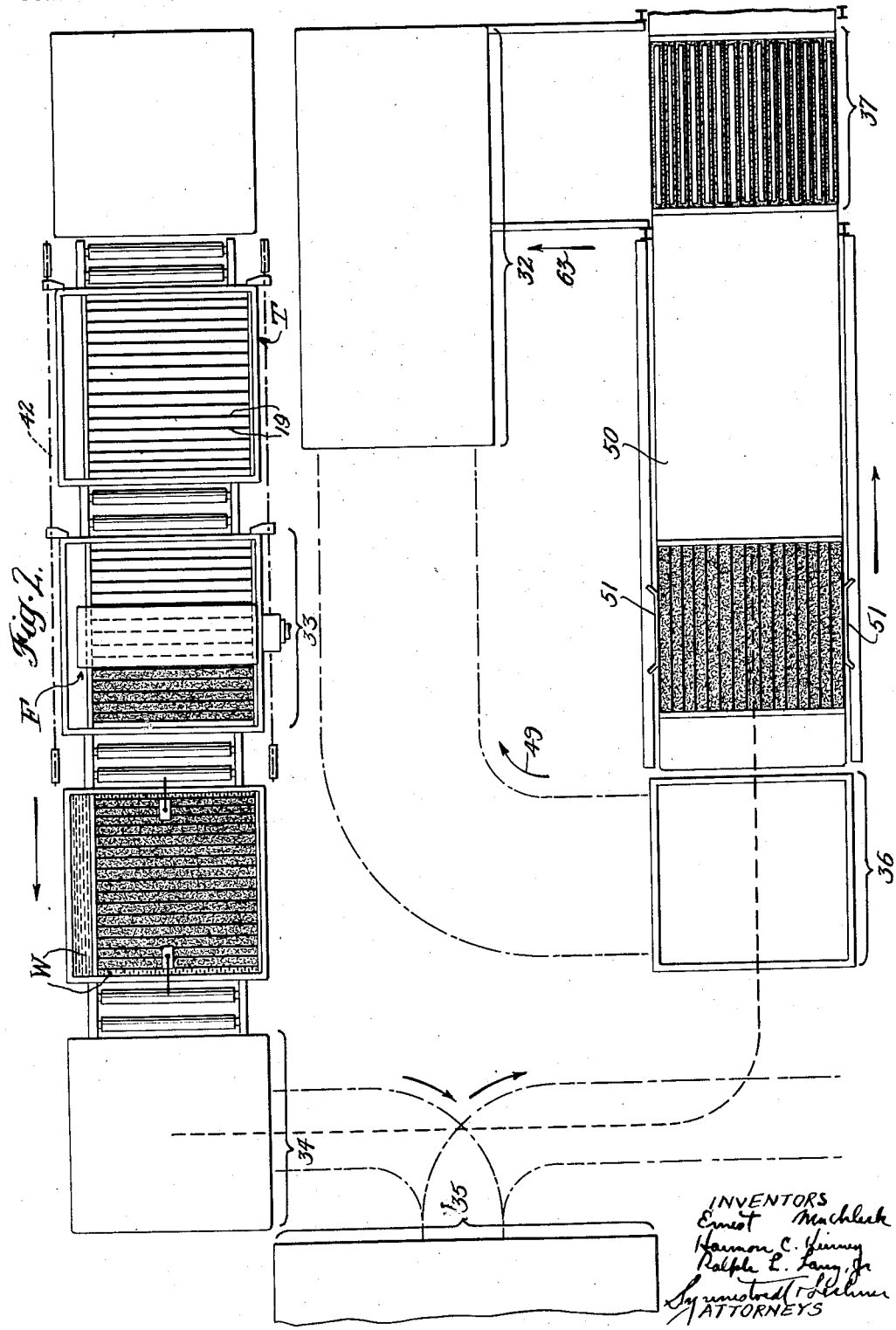

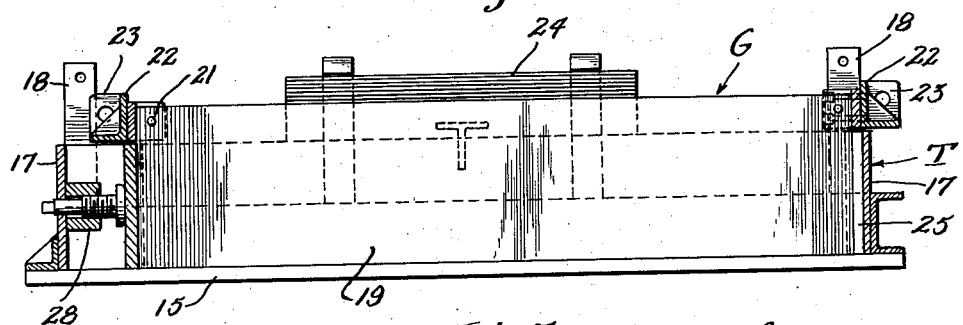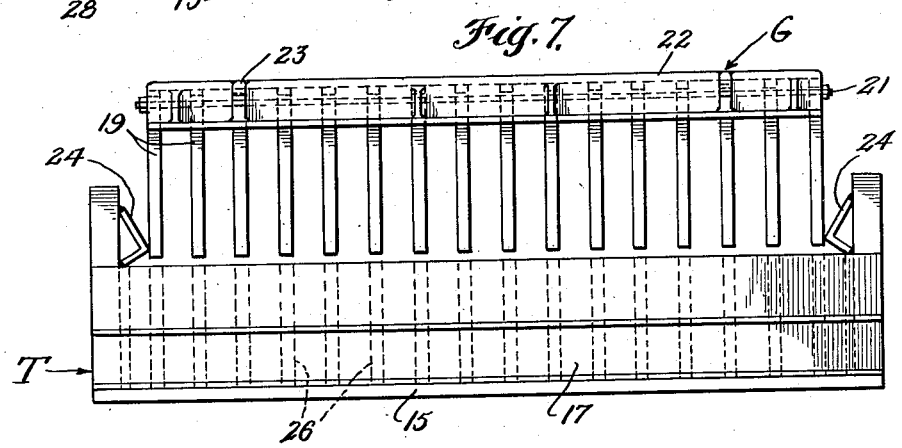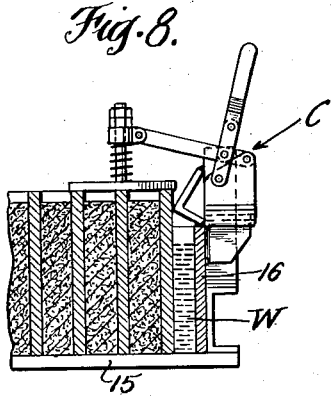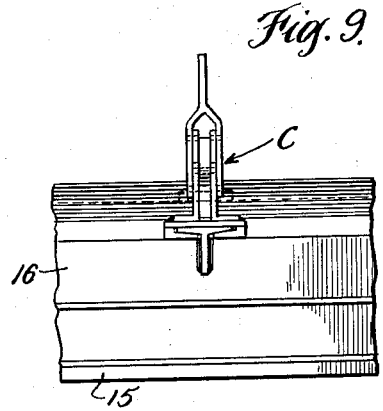

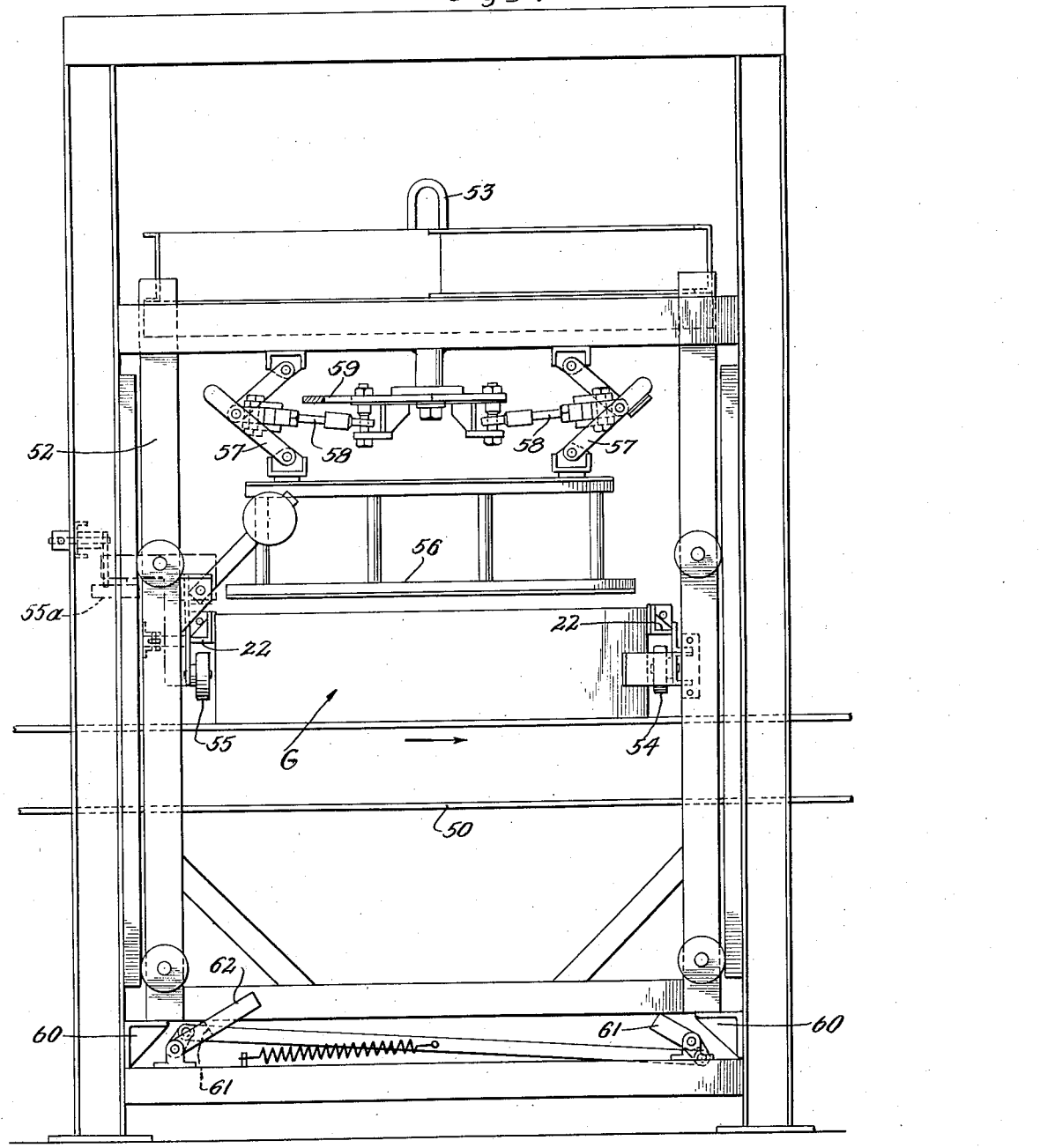

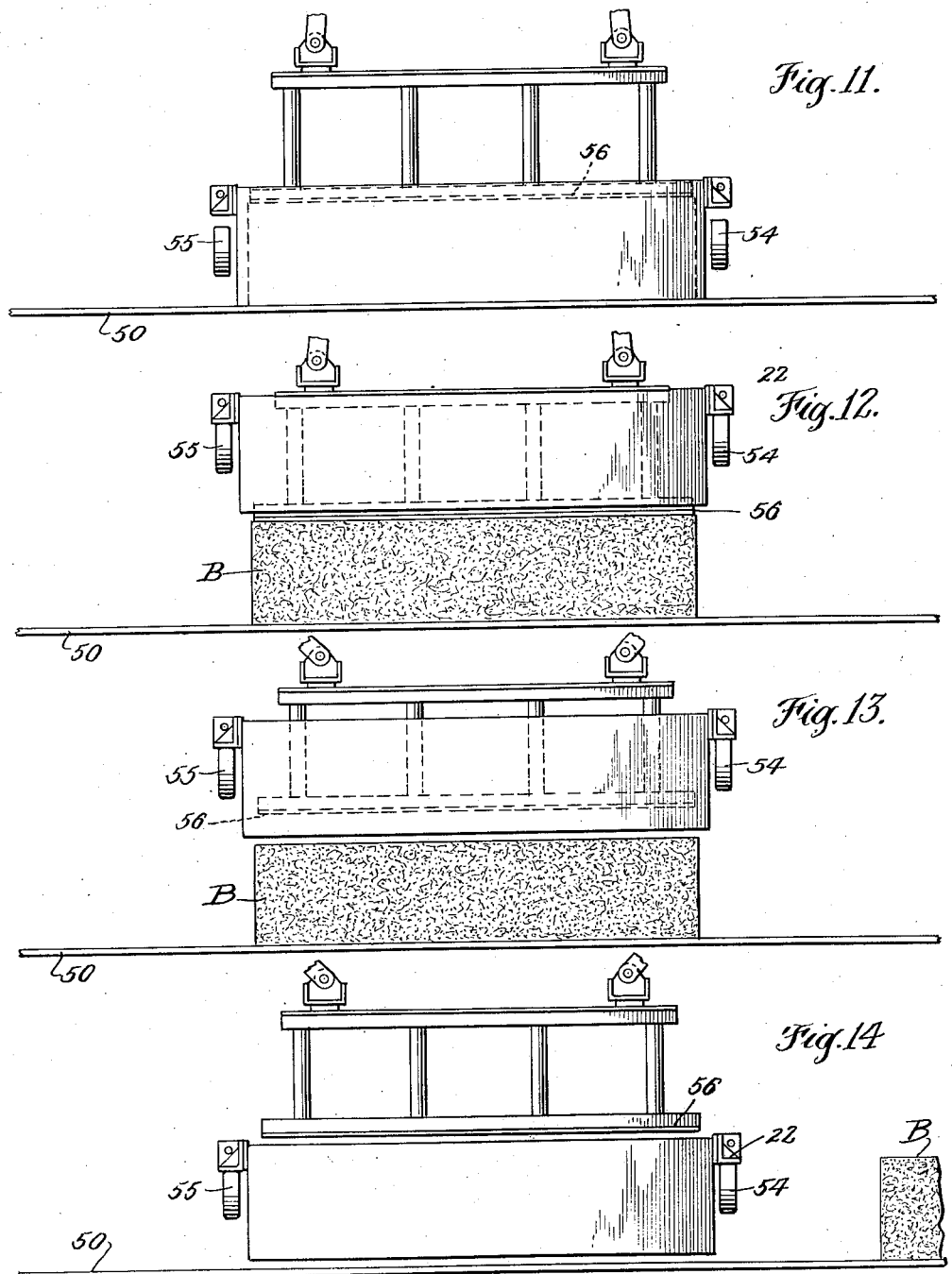

2,901,808

APPARATUS FOR MOLDING ARTICLES FROM MATERIAL IN SLURRY FORM

Ernest Muehleck, Horsham, Harmon C. Kinney, Ambler, and Ralph L. Lanz, Jr., Worcester, Pa., assignors to Keasbey & Mattison Company, Ambler, Pa., a corporation of Pennsylvania Application June 18, 1953, Serial No. 362,436

5 Claims. (Cl. 25—121)

This invention relates to molding of articles from material in slurry form, and is especially adaptable to the molding of insulating blocks or other shapes from a heat settable slurry of the general kind represented by the calcium silicate type of admixtures which are used for the formation of low density heat insulating blocks and other shapes.

Materials of the general kind referred to just above are described in copending application Serial No. 104,128, filed July 11, 1949, and issued August 23, 1955, as Patent No. 2,716,070, and assigned to the assignee of the present application. Briefly, such materials essentially consist of calcium hydroxide, siliceous material, and asbestos fibres, the ingredients being prepared in aqueous slurry form, placed in molds and then cured under high temperature and pressure, to thereby form low density thermal insulation blocks or the like therefrom.

Although the asbestos fibres serve as reinforcement to the articles molded in this way, the articles are relatively frangible and subject to breakage. In view of this, breakage tends to occur in the molding and handling of the pieces, especially when removing the cured or set articles from the molds.

One of the principal objects of the invention is the provision of an apparatus providing for the molding of blocks and the like from such materials in a manner greatly minimizing damage to and breakage of the articles.

The invention, moreover, accomplishes the foregoing while making provision for use of multiple molds, so as to produce a plurality of blocks or pieces in each molding operation.

In accordance with the preferred arrangement of the equipment, a mold structure is provided, in the form of a unitarily handleable assembly, having a multiplicity of mold cavities therein; and provision is made for separating certain parts of the mold assembly to facilitate ejection of the molded articles. Provision is also made for concurrently separating a plurality of molding articles from certain of the mold parts.

In accordance with another aspect of the invention, equipment is provided which enables substantially continuous advancement of a succession of mold assemblies from one stage to another in a cycle of operations, including cleaning of the mold parts, assembly thereof, filling the mold cavities, vibrating the charged mold assembly, autoclaving the charged molds, separating certain of the mold parts, separating the formed blocks, and returning the mold parts to the cleaning and assembly station. As explained more fully hereinafter, this system provides for convenient and efficient handling of the molding equipment, provides for the molding of accurately shaped pieces, and minimizes loss due to damage of the molded articles.

How the foregoing and other objects and advantages are attained will appear more fully from the following description referring to the accompanying drawings, in which—

Figures 1a and 1b, considered together, illustrate in side elevation and somewhat diagrammatically, all of the stages of the operation, and also show in outline a number of pieces of the equipment employed;

Figure 2 is a plan diagram of a layout of a system including all of the operations and major components of the equipment diagrammed in Figures 1a and 1b;

Figure 3 is a transverse vertical sectional view on an enlarged scale as compared with Figure 1, illustrating a mold charging or filling mechanism;

Figure 6 is a vertical sectional view of the mold assembly taken as indicated by the line 6—6 of Figure 5;

Figure 7 is an elevational view of mold parts shown in Figure 6, this view being taken from the right in Figure 6 and illustrating certain parts of the mold assembly part-way separated;

Figure 8 is a detail fragmentary sectional view of a portion of the mold assembly, with a clamping mechanism applied thereto for holding certain parts of the assembly together;

Figure 9 is a fragmentary elevational view taken from the right of Figure 8;

Figure 10 is an elevational view of mechanism employed for separating molded blocks or the like from a mold grid assembly which forms a part of the molding equipment; and Figures 11 to 14 inclusive are fragmentary views of certain parts shown in Figure 10, in different positions of adjustment occurring during the operation of separating the molded articles from the grid assembly.

Figure 4:
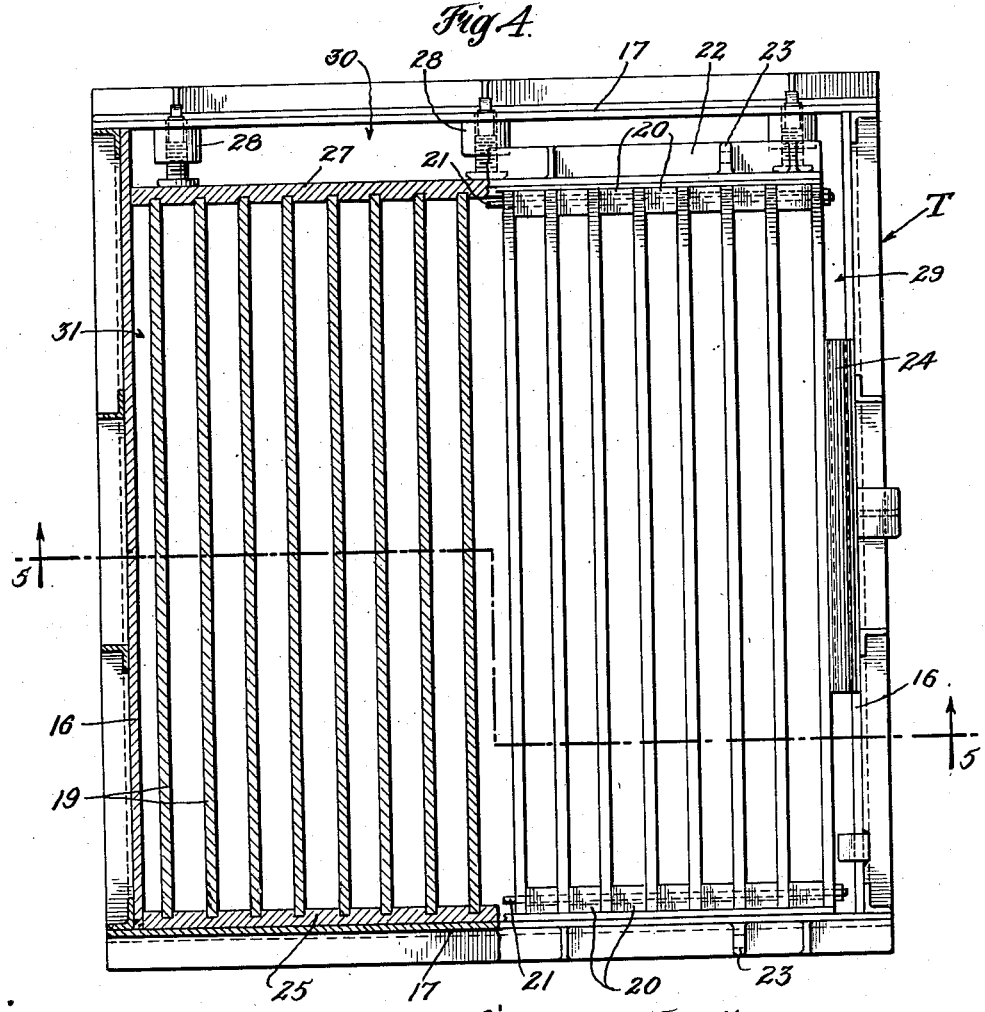
Figure 4 is a partial plan and partial horizontal sectional view of a mold assembly constructed according to the present invention, this view being taken as indicated by the line 4—4 on Figure 5.
Figure 5:
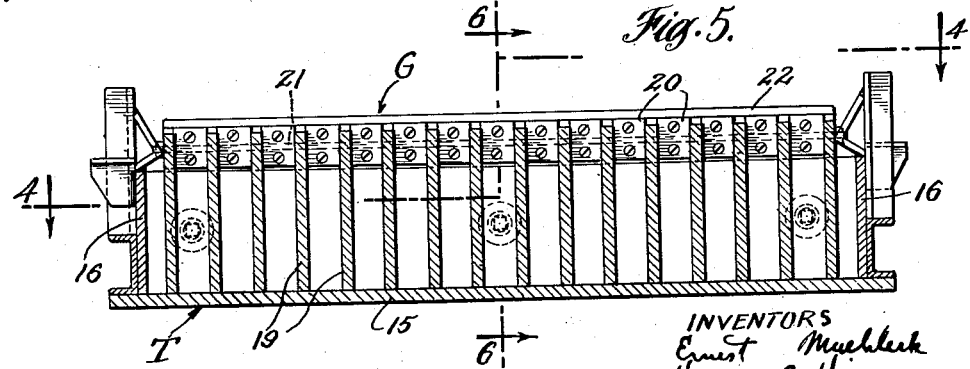
Figure 5 is a transverse sectional view of the mold assembly, taken substantially as indicated by the line 5—5 on Figure 4.

Although various features of the invention are applicable to the molding of pieces or articles of a variety of shapes, certain aspects of the invention are especially applicable to the molding of blocks or slabs and therefore block molding equipment is illustrated in the drawings and is described hereinafter for purposes of illustration. Thermal insulating blocks of this kind are advantageously of elongated slab shape, for example 36" long, 6" wide and 2" thick. A mold for forming blocks of this kind is shown in Figures 4 to 7 inclusive. In general this mold is of the pan-cast type, being arranged to provide a multiplicity of upwardly open mold cavities adapted to be charged with the slurry through the top openings of the cavities.

The principal structural parts of the mold comprise a pan or tray indicated generally by the letter T and an assembly of grid elements indicated generally by the letter G, which grid assembly is insertable in and removable from the tray T as is indicated in Figure 7.

The tray and the grid assembly are rectangular in plan pattern and the plan dimensions of the grid assembly are somewhat less than those of the tray so that when the grid assembly is placed in the tray, some free space is provided around the tray, for purposes which will be described.

The tray and grid parts are desirably made of metal, for instance sheet or plate steel, and the tray includes a bottom plate 15 and pairs of opposed upright side walls 16—16 and 17—17. At the corners of the tray upwardly extending apertured lugs 18 are provided for cooperation with lift or hoist mechanism for handling the tray.

The grid assembly includes a plurality of partition or grid elements 19 lying in parallel vertical planes and interspaced by means of spacer blocks 20, the assembly of grids and blocks being secured together by tie rods 21. Angle members 22 extend along the ends of the grid elements 19 near the upper edges thereof. These serve for reinforcement of the grid assembly and also serve as tracks for support of the grid assembly on rollers described hereinafter. Apertured lugs 23 are arranged toward the ends of the angle members 22 and serve as a means for handling the grid assembly, as by means of a hoist. The grid assembly is adapted to be lowered into the tray in the manner illustrated in Figure 7, and inclined guides 24 secured to the upright tray walls 16 serve to position the grid assembly with respect to the tray as the assembly is being lowered into the tray. A plate 25 is provided in the tray adjacent one of the upright walls 17, which plate may either be separate from the tray structure or fastened therein. This plate has grooves 26 (see Figures 4 and 7) adapted to receive and position the ends of the grid elements 19. A similar and separately removable plate 27 is arranged at the opposite ends of the grid elements 19, also being grooved to receive and position the ends of the grid elements. This removable plate 27 is adapted to be seated tightly against the grid elements by means of screw jack devices 28 which react between the plate and the adjacent upright wall 17 of the tray.

In this way the grid structure is positioned and fastened in the tray, with the lower edges of the grid elements adjacent the bottom wall of the tray and with some free space surrounding the grid assembly on several sides thereof, as indicated in Figure 4 at 29, 30 and 31. The purpose of this space will be described more fully hereinafter.

With the foregoing description of the mold assembly in mind, attention is now directed to the method or system contemplated in the use of the mold structure. In describing the method, reference is first made to the illustration of Figures 1a, 1b and Figure 2, wherein the principal stations and operations are indicated by brackets, with reference numerals applied thereto, beginning with 32. The several stations are as follows:

32—cleaning, preparation and assembly of mold assemblies
33—mold filling
34—mold vibrating
35—autoclaving
36—separation of mold grid assembly from other mold parts
37—separation of molded blocks from between mold grid elements
38—delivery station for separated blocks The several operations preferably carried out at and between the above listed stations are as follows:

At station 32 the mold parts, especially the grid assembly G and tray T are cleaned and assembled in the manner which will be fully apparent from the above description of Figures 4 to 7 inclusive. In addition to cleaning, the grid assembly and at least the inside of the bottom wall of the tray are desirably coated with a parting and lubricating compound, for instance a solution in a petroleum solvent of paraffin having powdered mica dispersed therein, together with a gelling agent, such as aluminum stearate. For purposes of coating the mold parts, the grid is advantageously dipped in a bath of the coating compound, and the compound is desirably painted upon the inside of the bottom wall of the tray.

As the mold parts are of considerable weight, they are advantageously handled by means of hoists, such as diagrammatically indicated at 39, adapted to travel on overhead tracks such as diagrammatically indicated at 40.

Upon cleaning, preparation and assembly, the assembled mold structure is placed upon a roller ball type of table indicated at 41 in Figure 1a. From there the assembly is advanced onto the top run of an endless conveyor 42 to be carried by the conveyor to the filling station 33, into proper registering position with the mold filling equipment which is indicated in general in Figures 1a and 2 by the letter F, and which is also shown in Figure 3.

The details of construction of the mold filling equipment need not be considered herein as they form no part of the present invention per se, being described and claimed in copending application of Clyde R. Hutchcroft, Willard R. Seipt and Robert A. Schneider, Serial No. 362,454, filed concurrently herewith, and issued December 17, 1957, as Patent No. 2,816,321, and assigned to the assignee of the present application. Only a few parts of the filling equipment are briefly described herein, with reference to Figure 3. The equipment includes a chamber 43 for receiving a charge of the slurry, which chamber is elongated to extend substantially throughout the length of the individual mold cavities lying between the grid elements 19. A displaceable gate 44 closes the bottom of the chamber 43 and, upon displacement of the gate dumps the charge into the nested troughs 45 and 46, the latter being mounted for vertical movement, for instance on upright guide posts 47. The troughs 45 and 46 are also elongated to extend substantially throughout the length of the individual mold cavities between the grid elements 19. When viewed in transverse section, as in Figure 3, the lower trough 46 terminates downwardly in a funnel-shaped opening of width providing for loading of mold cavities individually, the funnel opening being, of course, elongated to extend throughout the length of the cavities.

During the filling operation, the mold assembly is advanced under the filling mechanism F step-by-step and each mold cavity is successively filled with an appropriate charge of the slurry to be molded. The filling operation is accomplished in a manner providing fibre orientation lengthwise of the mold cavities. The way in which this orientation is achieved need not be considered herein, but is fully described in the copending application Serial No. 362,454, filed June 18, 1953, above referred to.

After the charging of the mold cavities, the free spaces 29, 30 and 31 (see especially Figures 2, 4 and 8) are filled with water as indicated at W, thereby preventing any substantial leakage of slurry under the grid elements 19 or under the removable end plate 27 into said free spaces. This serves another purpose related to the subsequent separation of the mold parts, in the manner referred to hereinafter.

Clamping mechanism such as generally indicated at C in Figures 1a, 8 and 9 are also applied so as to tightly hold the grid assembly in position in the tray during the following vibrating operation, which occurs at station 34. The details of this clamping mechanism need not be considered herein, as they form no part of the present invention per se, but it may here be mentioned that they are desirably displaceable or removable so as to facilitate subsequent separation of the grid assembly from the tray structure. The use of the clamps is only contemplated during the vibrating operation and the clamps are therefore removed immediately following that operation.

Station 34 in effect constitutes a vibrating table, for instance a table having a vertical throw of a fraction of an inch, the effect of which is to eliminate air pockets from the slurry in the mold cavities, without, however, appreciably disturbing the previously established fibre orientation lengthwise of the mold cavities. Upon completion of the vibrating operation, in addition to removing the clamps, the charges in the several mold cavities are preferably leveled, adding additional slurry to individual cavities, if needed in order to bring the top level of the charges in all of the cavities to about the same vertical point.

The charged molds are now stacked on suitable carts, such as indicated diagrammatically at 48 and a plurality of loaded carts may be run into an autoclave, represented by station 35. In the autoclave, the charged molds are subjected to heat and pressure, for instance to a temperature of from about 338° F. to about 370° F. and a pressure of from about 100 pounds to about 160 pounds per square inch gage of saturated steam. This autoclaving is continued sufficiently to set or cure the material being molded, for instance from about 2 to about 20 hours, after which the pressure and temperature in the autoclave are reduced and the molds taken out.

It is important to keep in mind that during the autoclaving, the metal parts of the mold assemblies expand because of the elevation of temperature, thereby slightly enlarging the mold cavities. The setting or curing operation thus occurs while the mold cavities are somewhat enlarged. Upon cooling, the metal parts of the mold assembly again contract, in consequence of which the mold cavity surfaces tightly engage the molded blocks. The separation of the molded articles from the mold structure therefore represents a special problem, and particularly so in view of the relatively frangible nature of the articles being formed.

During the autoclaving, the water W in the free spaces 29, 30 and 31 lying between the grid assembly and the upright walls of the tray is evaporated, and since these free spaces do not contain cured or set slurry, the grid assembly may now be separated from the tray without difficulty. This separation is accomplished at station 36, by lifting the grid structure out of the tray, after release of the screw jacks 28 (see Figure 4). The trays may then be returned to the initial station 32 as by an overhead traveling hoist, for instance in the path indicated by the arrow 49 in Figure 2. The grid assembly, with the molded blocks still retained therebetween is placed upon the top run of a conveyor indicated diagrammatically at 50, being placed on the conveyor with the grid elements 19 extended lengthwise of the conveyor and laterally positioned as by stationary guides 51. Conveyor 50 carries the grid assembly, together with the blocks between the elements thereof to station 37, comprising mechanism for separating the blocks, which mechanism is indicated in general in Figure 1b by the letter S. This mechanism is also shown in greater detail in Figures 10 to 14, inclusive, now to be described.

The block separating mechanism includes a stationary frame structure through which the conveyor 50 travels, the details of which frame structure need not be described herein. Within the stationary frame structure is a vertically movable frame 52 which may be raised and lowered by suitable mechanism (not shown) adapted to be connected with the movable frame, as by a loop or eye 53. This movable frame carries pairs of rollers 54 and 55 positioned to engage under the channel members 22 of the grid assembly so as to provide for lifting of the grid assembly with the frame 52. The rollers 55 are mounted by means of pivoted brackets so that these rollers may be swung upwardly out of the path of an entering grid assembly, for instance to the position indicated at 55a in Figure 10.

The vertically movable frame also carries a plurality of bars 56, somewhat in the nature of stripper elements, each one of which is adapted to engage the top surface of a molded block in one of the mold cavities between adjacent grid elements 19 of the grid assembly. The bars 56 are vertically movable as a unit with respect to the stationary framing. Scissors linkages 57 are provide for this purpose, the linkages being actuable to raise and lower the set of bars 56 as by links 58. The details of these parts need not be considered herein, but it may be mentioned that a manually operable lever 59 is provided to give the operator appropriate control over the vertical position of the bars 56 with respect to the stationary movable framing.

Stop devices 60 limit the downward movement of the frame 52. Another position of the frame 52, slightly above the lowermost position, is determined by displaceable stop devices 61 which are shiftable into and out of operating position by means of a manually operable lever 62.

The sequence of operations effected by this block separating mechanism is illustrated in Figures 10 to 14 inclusive. After the conveyor brings a grid assembly, such as indicated at G in Figure 10 into position for block separation, the stripper bars 56 are brought downwardly to the upper surface of the blocks in the individual mold cavities, this condition being indicated in Figure 11. The frame 52 is then raised, as a result of which the pairs of rollers 54 and 55 engage under the angle members 22 of the grid assembly and lift the grid assembly while the blocks B are held adjacent to the conveyor 50 by means of the stripper bars 56. This operation is illustrated in Figure 12.

As shown in Figure 13, the stripper bars 56 are then raised to free the blocks B and the conveyor is operated to carry the separated blocks toward the final or delivery station 38. As shown in Figure 14, after the blocks B have been carried away, the frame 52 is lowered to the position established by the stops 61 (see Figure 10), in which position the grid assembly is supported by the rollers 54 and 55 at an elevation just above the conveyor 50. The grid assembly is then moved transversely of the conveyor 50, i.e., in the direction of the arrow 63 in Figure 2, for return of the grid assemblies to the initial station 32. The stops 61 are then displaced by means of the control 62 and the frame 52 again descends to the lowermost position, in preparation for the handling of the next grid assembly.

In connection with the above described operation of separating the formed blocks from between the grid elements 19 of the grid assembly, it is first mentioned that the grid elements advantageously are slightly tapered in thickness, with the thinner edges presented downwardly. This taper need only be very slight and is therefore not even illustrated in the drawings.

By virtue of the arrangement of the several mold parts it will be observed that provision is made for separating all of the mold walls from the individual mold cavities, except for the side faces of the cavities, i.e., those faces which are formed by the grid elements 19 themselves. The removal of the end walls of the mold cavities prior to displacement of the blocks from between the grid elements is especially advantageous, for the reason that the expansion of the mold cavities during heating in the autoclave, and the subsequent contraction of the cavities during subsequent cooling, is at a maximum in the direction paralleling the long dimension of the cavities. Therefore, preliminary removal of the end walls of the cavities is especially advantageous in avoiding damage to the ends of the blocks when they are ultimately separated.

According to the foregoing, method and apparatus are provided for the multiple molding of insulation blocks, with minimum danger of block breakage, notwithstanding use of the method and apparatus with materials such as slurries of calcium silicate.

We claim:

1. Equipment for use in molding blocks from material in slurry form, comprising a tray having a bottom wall and two pairs of parallel opposed side walls, the bottom and side walls together forming a liquid-tight structure, a grid in the tray comprising an assembly of a plurality of parallel grid elements positioned with their lower edges adjacent the bottom wall of the tray and serving to divide the tray space into a plurality of mold cavities, the grid elements being perpendicular to the side walls of one of said pairs and parallel to the side walls of the other of said pairs, the ends of the grid elements adjacent one side wall of said one of said pairs being terminated short of said side wall to provide a free space within the tray between said ends of the grid elements and said side wall of the tray, and a displaceable member in said free space for closing the ends of the mold cavities adjacent said free space, the grid elements of said assembly being interconnected and upwardly removable as a unit from the tray.

2. A construction according to claim 1 in which said other of said pairs of dimension of the grid assembly in the direction transverse the grid elements is less than the distance between the side walls of the tray, to provide a free space between the grid assembly and at least one of the side walls of said other pair.

3. A construction according to claim 1 and further including a releasable device for holding the displaceable closure member in position to close the ends of the mold cavities.

4. A construction according to claim 1 and further including a guide member mounted on one of the side walls parallel with the grid elements for relatively positioning the grid assembly and the tray as the grid assembly is lowered into the tray, said guide member including an inclined guiding surface extending downwardly and inwardly of the tray.

5. A construction according to claim 1 in which the grid assembly includes a pair of track elements extending transversely of the grid elements, one of said track elements being mounted to interconnect the ends of the grid elements adjacent one side wall of said one of said pairs and the other track element being mounted to interconnect the ends of the grid elements adjacent the other side wall of said one of said pairs.

References Cited in the file of this patent

UNITED STATES PATENTS

| Number | Name | Date |
|---|---|---|
| 531,237 | Walsh | Dec. 18, 1894 |
| 533,843 | Dodge | Feb. 5, 1895 |
| 679,232 | Kimble | July 23, 1901 |
| 709,495 | Levi | Sept. 23, 1902 |
| 810,300 | Pettit et al. | Jan. 16, 1906 |
| 812,336 | Glatfelter | Feb. 13, 1906 |
| 818,452 | Judie | Apr. 24, 1906 |
| 848,955 | Bartlett | Apr. 2, 1907 |
| 970,727 | Lake | Sept. 20, 1910 |
| 977,025 | Makowski | Nov. 29, 1910 |
| 1,000,089 | Haas | Aug. 8, 1911 |
| 1,119,095 | Meece | Dec. 1, 1914 |
| 1,456,411 | Warren | May 22, 1923 |
| 1,490,937 | Pedersen | Apr. 22, 1924 |
| 1,608,690 | Ashenhurst | Nov. 30, 1926 |
| 1,846,290 | Walter | Feb. 23, 1932 |
| 2,131,474 | Hendersen | Sept. 27, 1938 |
| 2,220,448 | Henderson | Nov. 5, 1940 |
| 2,433,265 | Denning | Dec. 23, 1947 |
| 2,483,498 | Lewon et al. | Oct. 4, 1949 |
| 2,540,354 | Selden | Feb. 6, 1951 |

UNITED STATES PATENT OFFICE
CERTIFICATE OF CORRECTION

Patent No. 2,901,808 September 1, 1959

Ernest Muehleck et al.

It is hereby certified that error appears in the printed specification of the above numbered patent requiring correction and that the said Letters Patent should read as corrected below.

Column 6, line 75, for "said" read -- the --; column 7, line 1, strike out "other of said pairs of"; line 3, for "the" first occurrence, read -- said other of said pairs of --.

Signed and sealed this 1st day of November 1960.

(SEAL)
Attest:

KARL H. AXLINE
Attesting Officer

ROBERT C. WATSON
Commissioner of Patents